United States Patent Office.

HENRY DAVIS POCHIN, OF SALFORD, ENGLAND.

IMPROVEMENT IN PREPARING CLAY FOR ALUM-MAKING.

Specification forming part of Letters Patent No. 15,934, dated October 21, 1856.

*To all whom it may concern:*

Be it known that I, HENRY DAVIS POCHIN, of Salford, in the county of Lancaster, England, manufacturing chemist, have invented improvements in the treatment of certain compounds of alumina, and the application of the same in printing, dyeing, tawing, paper-making, deodorizing, disinfecting, and such like purposes; and I do hereby declare the following to be a full, clear, and exact description of the same.

I take clay composed of various quantities of silica, alumina, iron, and water or clay without iron, when it can be had. I find that I can use with advantage and economy clay containing about forty-five of silica, thirty-seven of alumina, three-tenths of oxide of iron, and seventeen and seven-tenths of water in one hundred parts. Such clay I first dry by subjecting it to heat, so as to get rid of a portion of the moisture and fit it for grinding, and then I proceed to grind it to a moderately-fine powder in an ordinary clay-mill or other suitable apparatus for grinding clay, and I afterward mix it well together with various proportions of one or more of the following substances—namely: powdered charcoal, peat, pitch, pitch-coke, soot, sawdust, spent dye-wood, or other carbonaceous matters which leave little ash or iron after combustion. I find that about one part, by weight, of powdered charcoal will do to burn with about six parts of clay, and when I use pitch I find it desirable to use about equal weights of clay and pitch; but I do not confine myself to those proportions. I then heat in a reverberatory or other furnace which will supply oxygen to the roasting substance the clay so prepared until the whole of the carbonaceous matter is burned away. Other minerals containing variable proportions of silica and alumina may be used in the place of clay with like results.

By means of the above improved method of roasting clay or other aluminous minerals in contact with carbonaceous matters I find that it not only more readily combines with acids, but I liberate more completely the silica united with it. The whole of the alumina contained in the clay or other mineral so prepared will combine with sulphuric as well as with other acids, which has not hitherto been effected in so economical a manner.

The process of roasting clay thus prepared is as follows: I subject the clay and charcoal, mixed in proportion as above described, for about two hours to the action of heat in a reverberatory or other convenient furnace, during which time it is to be well stirred until the whole of the water has been evaporated and the powder brought into a condition to be easily acted upon by sulphuric acid, which may be known by treating a small portion of it in a platinum crucible with sulphuric acid of a known specific gravity and then subjecting it to heat, and afterward dissolving it in a known quantity of water and ascertaining the specific gravity of the solution. This powder is then passed through a fine sieve of about eighty meshes to the square inch. One ton of it is intimately mixed with about twenty-five hundred weight of sulphuric acid having a specific gravity of about 1.735, and afterward a sufficient quantity of water is added, as much as will reduce the specific gravity of the sulphuric acid employed to about 1.485. It is then placed in a leaden or other suitable vessel and steam or fire-heat applied, being well agitated until it reaches a temperature of 212° Fahrenheit, when the sulphuric acid combines with the alumina of the clay, causing a violent action; or I apply heat to the mixture of strong acid and clay, and do not add the water until after the violent action has subsided. It is afterward continued at a boiling temperature for about four hours, so as to insure the combination of the whole of the acid with the alumina. The mass so produced will contain fourteen per centum of soluble alumina, being a much more soluble alumina than is contained in crystallized ammonia or potash alums. This may be determined by any of the ordinary tests; but I prefer to use for this purpose a solution of caustic ammonia of a known strength, which is added to a given quantity of the cake produced dissolved in water, and after carefully noting the specific gravity the ammonia is added until an alkaline reaction is obtained, which is shown by the application of litmus-paper to the solution. The fire is then withdrawn and the mass removed and allowed to cool. This compound I term "aluminous cake." It contains but little more than the silica originally in the clay and the sulphate of alumina formed by the action of the sulphuric acid on the alumina, and is free from uncombined acid.

I find that the aluminous cake obtained in manner above described can be advantageously employed for the purpose of manufacturing the aluminous mordants used by calico printers and dyers, and in various other processes used by dyers, and in the preparation of white leather in the process termed "tawing;" also, in the manufacture of paper as a substitute for alum and the ordinary sulphate of alumina, as well as for the purposes of deodorizing and disinfecting decomposing animal or vegetable matters; and for such purposes as above enumerated I find that it is not necessary to separate the silica and the small excess of clay which may have been used from the aluminous cake by any of the expensive processes, such as lixiviation and evaporation, which have hitherto been adopted in the preparation of the sulphate of alumina of commerce; but, if required, I can further purify this aluminous cake by dissolving one part of it in two parts of water and separating the silica from the solution by the ordinary modes of filtration. The clear solution is then evaporated until it sets into a hard cake upon cooling. The silica separated from the clear liquor can be used for those purposes for which a pure silica is required.

Having now described the nature of my said invention and the manner in which the some is to be performed, I declare that I claim—

The calcining of china clay or other aluminous minerals with the carbonaceous substances in the manner above described, by which the alumina is brought into a condition to be easily acted upon by strong sulphuric and other acids, without adding thereto any substance injurious to the quality of the resulting compound, and the use of aluminous cake obtained in manner above described in manufacturing the aluminous mordants used by calico printers and dyers, and in various other processes used by dyers, and in the preparation of white leather in the process termed "tawing;" also, in the manufacture of paper as a substitute for alum and the ordinary sulphate of alumina, as well as for the purpose of deodorizing and disinfecting decomposing animal or vegetable matters, and for the preparation of the ordinary sulphate of alumina and alums of commerce.

H. D. POCHIN.

Witnesses:
 EDWD. WM. BENNEY,
  *Solicitor, Manchester.*
 CHAS. LANE,
  *His Clerk.*